(12) United States Patent  
Horikawa (10) Patent No.: US 11,542,848 B2
(45) Date of Patent: Jan. 3, 2023

(54) CONTROL DEVICE FOR EXHAUST SYSTEM

(71) Applicant: DENSO CORPORATION, Kariya (JP)

(72) Inventor: Marie Horikawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/369,210

(22) Filed: Jul. 7, 2021

(65) Prior Publication Data

US 2021/0332734 A1 Oct. 28, 2021

Related U.S. Application Data

(63) Continuation of application No. PCT/JP2019/050563, filed on Dec. 24, 2019.

(30) Foreign Application Priority Data

Jan. 8, 2019 (JP) .................. JP2019-001293

(51) Int. Cl.
| | |
|---|---|
| *F01N 9/00* | (2006.01) |
| *F01N 3/10* | (2006.01) |
| *F01N 3/24* | (2006.01) |
| *F01N 13/00* | (2010.01) |
| *G01M 15/10* | (2006.01) |
| *G01N 27/407* | (2006.01) |

(52) U.S. Cl.
CPC .............. *F01N 9/00* (2013.01); *F01N 3/101* (2013.01); *F01N 3/24* (2013.01); *F01N 13/008* (2013.01); *G01M 15/102* (2013.01); *G01N 27/407* (2013.01)

(58) Field of Classification Search
CPC ... F01N 9/00; F01N 3/101; F01N 3/24; F01N 13/008; G01M 15/102; G01N 27/407
See application file for complete search history.

(56) References Cited

U.S. PATENT DOCUMENTS

2004/0195097 A1* 10/2004 Suzuki ............... G01N 27/4071
 204/426
2007/0089405 A1* 4/2007 Asanuma ................ F01N 11/00
 60/285

(Continued)

FOREIGN PATENT DOCUMENTS

| JP | 2001-349230 | 12/2001 |
|---|---|---|
| JP | 2003-293747 | 10/2003 |

(Continued)

*Primary Examiner* — Matthew T Largi
(74) *Attorney, Agent, or Firm* — Nixon & Vanderhye P.C.

(57) ABSTRACT

The present invention is applied to an exhaust system provided with a three-way catalyst and a NOx catalyst which are provided in an exhaust passage of an engine and to which sulfur components in exhaust adhere and release the attached sulfur components by rich components in exhaust, and NOx sensors provided downstream of the catalysts. The NOx sensor is a limiting current type sensor. It is determined whether a sulfur release state is present in which a sulfur component is released from the three-way catalyst and the NOx catalyst. When it is determined that it is in the state of sulfur release, reaction suppression processing for suppressing the reaction between oxygen and sulfur components in the pump cell electrodes and the monitor cell electrodes of the NOx sensors is performed.

6 Claims, 7 Drawing Sheets

(56) References Cited

U.S. PATENT DOCUMENTS

| | | | |
|---|---|---|---|
| 2009/0218220 A1* | 9/2009 | Matter | G01N 27/4074 204/424 |
| 2012/0055789 A1* | 3/2012 | Swartz | G01N 33/0054 204/415 |
| 2013/0034468 A1* | 2/2013 | Bisaiji | B01D 53/9495 422/111 |
| 2016/0146085 A1* | 5/2016 | Mizutani | G01N 27/4074 60/276 |
| 2016/0320285 A1* | 11/2016 | Weber | F02D 41/222 |

FOREIGN PATENT DOCUMENTS

| | | | |
|---|---|---|---|
| JP | 2007-87812 | | 4/2007 |
| JP | 2007087812 A | * | 4/2007 |
| JP | 4174952 | | 11/2008 |

* cited by examiner

CONTROL DEVICE FOR EXHAUST SYSTEM

CROSS REFERENCE TO RELATED APPLICATIONS

This application is the U.S. bypass application of International Application No. PCT/JP2019/050563 filed Dec. 24, 2019 which designated the U.S. and claims priority to Japanese Patent Application No. 2019-001293, filed Jan. 8, 2019, the contents of which are incorporated herein by reference.

BACKGROUND

Technical Field

The present disclosure relates to a control device for an exhaust system of an internal combustion engine.

Description of the Related Art

In an exhaust system, when sulfur is contained in fuel used in an internal combustion engine, SOx is generated by combustion of the internal combustion engine. There is a possibility that the SOx adheres to the catalyst provided in an exhaust passage of the internal combustion engine, resulting in deteriorating the properties of the catalyst. Therefore, an S purging (sulfur release processing) in which SOx is released from the catalyst is performed to minimize the deterioration of the properties of the catalyst.

SUMMARY

The present disclosure provides a control device for an exhaust system capable of minimizing poisoning of a gas sensor.

The present disclosure relates to a control device applied to an exhaust system includes: a catalyst provided in an exhaust passage of an internal combustion engine, having adhered thereto sulfur components in the exhaust gas and releasing the adhered sulfur components using rich components contained in the exhaust gas; and a gas sensor provided on the downstream side of the catalyst.

BRIEF DESCRIPTION OF THE DRAWINGS

The foregoing and other objects, features, and advantages of the present disclosure will be more clarified by the following detailed descriptions with reference to the accompanying drawings. In the accompanying drawings.

DETAILED DESCRIPTION OF THE PREFERRED EMBODIMENTS

In the exhaust system, during the S purging, SO2 released from the catalyst reacts with surrounding hydrogen to form hydrogen sulfide. The greater the amount of SO2 released at one time by the S purging, the more likely hydrogen sulfide is to be produced. However, it is desirable that hydrogen sulfide is not generated because hydrogen sulfide causes exhaust odor. In this respect, according to an exhaust gas purifying apparatus disclosed by Japanese patent, i.e. JP 4174952 B, when the temperature of the catalyst is high, the speed at which the catalyst is brought into a rich state is reduced, and control is performed so that a large amount of SO2 is not released at one time. A gas sensor for detecting a component of exhaust gas on the downstream side of the catalyst is provided on the downstream side of the catalyst in the exhaust passage. In particular, in the limiting current type gas sensor, oxygen and oxygen ions are present on the electrode exposed to exhaust gas by oxygen ions migrating in the solid electrolyte. Then, there is a possibility that the oxygen ions in the electrode react with hydrogen sulfide generated by the S purging, and sulfur remains on the electrode surface. In such a state where sulfur remains and adheres to the electrode surface, that is, in a state where the electrode surface is poisoned by sulfur, the gas sensor may deteriorate, for example, the gas to be detected cannot be normally detected.

Embodiments

Figure 1:
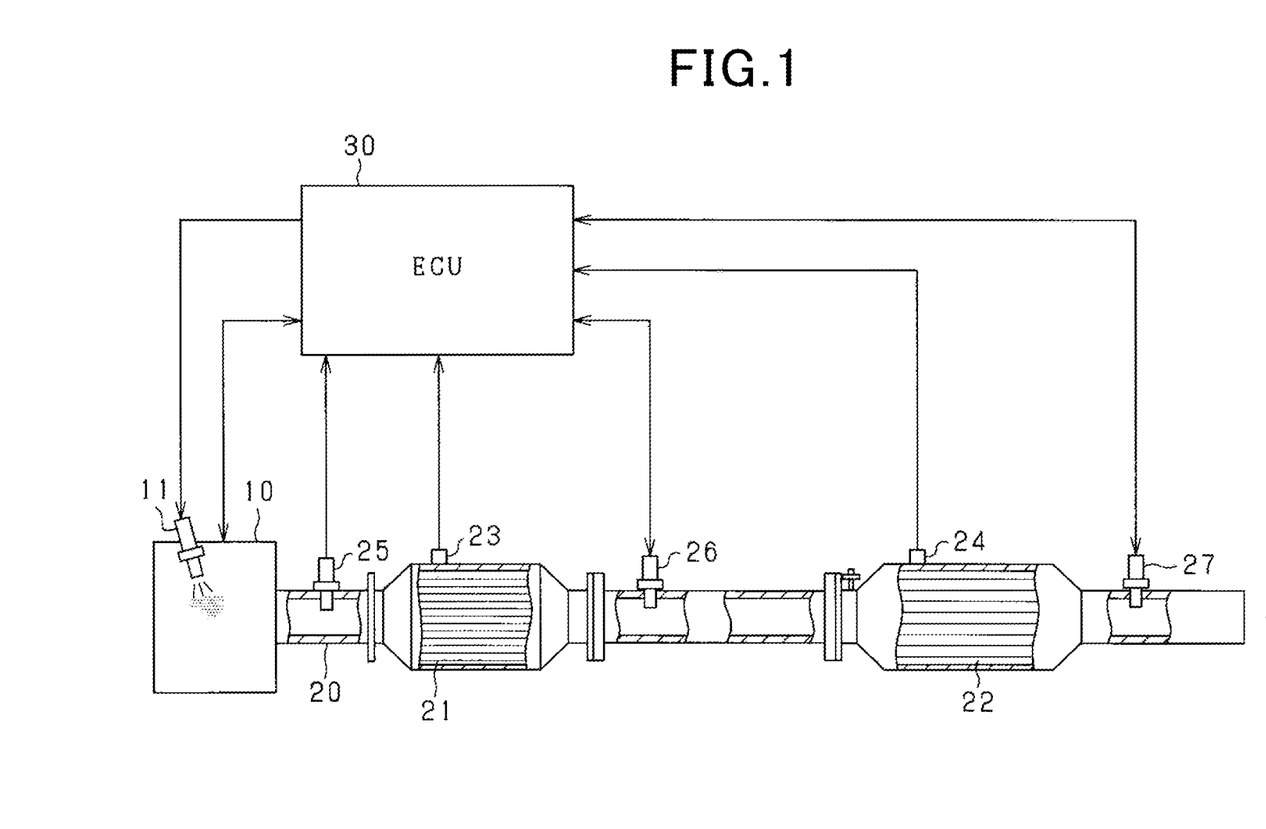
FIG. 1 is a schematic configuration diagram of an engine exhaust system according to the present embodiment.

Embodiments are described below with reference to the drawings. The present embodiment is directed to an exhaust system of an in-vehicle internal combustion engine. FIG. 1 is a schematic configuration diagram of an exhaust system of an engine 10. The flow of exhaust gas is indicated by an arrow in the figure.

The engine 10 has a general configuration, and generates rotational force on the crankshaft by combustion of fuel. The engine 10 may be a diesel engine, or a gasoline engine which is operated at a lean air-fuel ratio in addition to operation at a theoretical air-fuel ratio and operation at a rich air-fuel ratio.

The engine 10 is connected to an intake passage for supplying air to each combustion chamber and an exhaust passage 20 for discharging exhaust gas from each combustion chamber. The engine 10 is provided with a fuel injection device 11 for injecting fuel into each combustion chamber.

In the exhaust passage 20, a three-way catalyst 21 for purifying CO, HC and NOx in the exhaust gas and an NOx catalyst 22 which is a NOx storage reduction type catalyst are provided in series. The NOx catalyst 22 stores NOx in the exhaust gas, and reduces and cleans the stored NOx when the exhaust gas is in a reducing atmosphere (when unburned fuel or the like exists in the exhaust gas). The reducing agent of the NOx catalyst 22 may be fuel injected during combustion in the fuel injection device 11 or fuel injected after combustion in the fuel injection device 11. A fuel supply valve may be provided in the exhaust passage 20, and the fuel supplied from the fuel supply valve may be used as a reducing agent.

The three-way catalyst 21 and the NOx catalyst 22 are provided with temperature sensors 23, 24 for detecting the temperature of the catalyst. The temperature sensors 23 and 24 may detect the temperature inside the catalysts 21 and 22, or may detect the exhaust temperature immediately before or after the catalysts 21 and 22 to estimate the temperature of the catalysts 21 and 22.

In the exhaust passage 20, an exhaust air temperature sensor 25 for detecting the temperature of exhaust gas is provided on the upstream side of the three-way catalyst 21. Further, NOx sensors 26 and 27 configured of limiting current sensors as gas sensors are provided between the three-way catalyst 21 and the NOx catalyst 22 and on the downstream side of the NOx catalyst 22. Other sensors may be provided in the exhaust passage 20. For example, an air-fuel ratio sensor may be provided upstream of the three-way catalyst 21, or an air-fuel ratio sensor or an O2 sensor may be provided between the three-way catalyst 21 and the NOx catalyst 22, or downstream of the NOx catalyst 22.

Detection signals from the various sensors 23-27 are sent to the ECU 30. The ECU 30 is an electronic control device provided with a microcomputer having a CPU, ROM, RAM, etc., and its peripheral circuits, and controls various devices such as an engine 10 and an exhaust system. The ECU 30 controls the fuel injection device 11 or the like based on, for example, the accelerator opening and the engine rotational speed.

Figure 2:
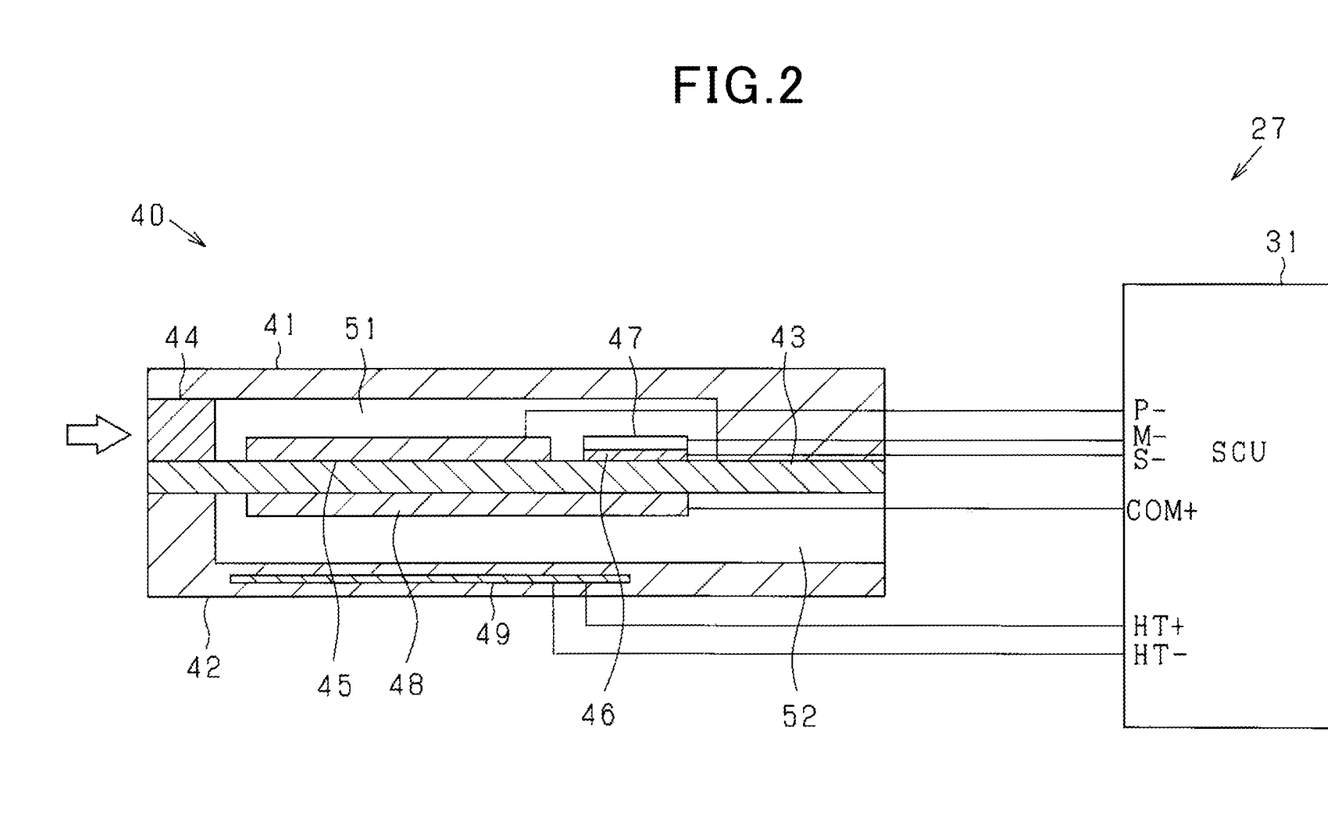
FIG. 2 is a schematic configuration diagram of a gas sensor.

Next, the NOx sensors 26 and 27 will now be described. Each of the NOx sensors 26 and 27 has the same configuration, and the NOx sensor 27 will be described below. FIG. 2 is a schematic configuration diagram of a NOx sensor 27 which serves as a gas sensor. Note that the left-right direction in FIG. 2 is the longitudinal direction of a sensor element 40, and the left side in FIG. 2 is the tip end side of the element.

The NOx sensor 27 includes the sensor element 40 and an SCU (Sensor Control Unit) 31 for controlling the sensor element 40. The SCU 31 is a microcomputer having a CPU, a ROM, a RAM, and the like, and controls the sensor element 40 based on a command from the ECU 30.

The sensor element 40 includes a first body part 41 and a second body part 42 made of an insulator such as alumina, and a solid electrolyte 43 arranged between the first body part 41 and the second body part 42. A gas chamber 51 into which exhaust gas is introduced is formed between the first body part 41 and the solid electrolyte 43, and a reference chamber 52 into which air as a reference gas is introduced is formed between the second body part 42 and the solid electrolyte 43. An end portion of the reference chamber 52 opposite to the tip end side of the sensor element 40 is opened.

The solid electrolyte 43 is a plate-like member composed of an oxygen ion conductive solid electrolyte material such as zirconia oxide. The solid electrolyte 43 is maintained at a predetermined active temperature by controlling energization of a heater 49 provided in the second body part 42. On the tip end side of the sensor element 40, a diffusion resistance 44 is disposed between the first body 41 and the solid electrolyte 43. The diffusion resistance 44 is made of a porous material or a material in which pores are formed. By the effects exerted by the diffusion resistance 44, the rate of exhaust gas introduced into the gas chamber 51 is controlled.

A pump cell electrode 45, a sensor cell electrode 46, and a monitor cell electrode 47 are provided on a surface (exhaust side) of the solid electrolyte 43 facing the gas chamber 51. The pump cell electrode 45 is arranged on the inlet side of the gas chamber 51 near the diffusion resistance 44, that is, on the upstream side in the gas chamber 51, and the sensor cell electrode 46 and the monitor cell electrode 47 are arranged on the downstream side in the gas chamber 51 from the pump cell electrode 45. On the surface of the solid electrolyte 43 facing the reference chamber 52, common electrodes 48 are provided at positions corresponding to the respective electrodes 45 to 47. The pump cell electrode 45 and the monitor cell electrode 47 correspond to the "exhaust side electrode", and the common electrode 48 corresponds to the "reference side electrode". Alternatively, the exhaust side electrode such as the pump cell electrode 45 may be directly exposed to the exhaust without providing the first main body 41 and the gas chamber 51. The common electrode 48 may be divided into electrodes corresponding to the pump cell electrode 45, the sensor cell electrode 46, and the monitor cell electrode 47.

When a voltage is applied between the pump cell electrode 45 and the common electrode 48, oxygen contained in exhaust gas in the gas chamber 51 is ionized at the pump cell electrode 45, and oxygen ions and oxygen are present on the pump cell electrode 45. Then, oxygen ions migrate toward the common electrode 48 in the solid electrolyte 43. The electric charge is discharged in the common electrode 48 to form oxygen, which is discharged to the reference chamber 52. Thus, the inside of the gas chamber 51 is maintained in a predetermined low oxygen state. When the inside of the exhaust passage 20 is in a rich state containing unburned fuel, the inside of the solid electrolyte 43 may be moved from the side of the common electrode 48 to the side of the pump cell electrode 45 in order to maintain a predetermined hypoxic state.

The concentration (NOx concentration) of a specific gas component in the gas chamber 51 is detected on the basis of an oxygen ion current flowing between the sensor cell electrode 46 and the common electrode 48 while the gas chamber 51 is in a predetermined low oxygen state. The residual oxygen concentration in the gas chamber 51 is detected based on an oxygen ion current flowing between the monitor cell electrode 47 and the common electrode 48. The monitor cell electrode 47, like the pump cell electrode 45, has a function of discharging oxygen in gas, and oxygen ions and oxygen are present on the monitor cell electrode 47.

Next, the adhesion and release of sulfur components in the NOx catalyst 22 will be described. Since the NOx catalyst 22 is more likely to cause adhesion and release of sulfur components than the three-way catalyst 21, the NOx catalyst 22 will be described, but the same condition will also occur when adhesion and release of sulfur components occur in the three-way catalyst 21.

Sulfur oxides (SOx) are generated by the combustion of sulfur components contained in fuel and lubricating oil in the combustion chamber. The NOx catalyst 22 stores these SOx as well as NOx under an oxidizing atmosphere. That is, SOx adheres to the NOx catalyst 22. On the other hand, in the reducing atmosphere, NOx and SOx are released from the NOx catalyst 22 by a reducing agent (rich component such as unburned fuel). However, the SOx is more stably adhered to the NOx catalyst 22 than the NOx is. Therefore, substantially no SOx is released from the NOx catalyst 22 by the NOx release processing. Therefore, there is a possibility that SOx remains in the NOx catalyst 22 and the storage performance of the NOx catalyst 22 deteriorates.

Therefore, in the present embodiment, the amount of the sulfur component adhering to the NOx catalyst 22 (sulfur adhesion amount Ai) is calculated. Based on the calculated sulfur adhesion amount Ai, it is determined whether sulfur release processing is necessary. When it is determined that the sulfur release processing is necessary because the sulfur adhesion amount Ai is larger than the reference value, control is performed to set the SOx to a sulfur release state for releasing the SOx from the NOx catalyst 22 (S purging). Specifically, the temperature of the NOx catalyst 22 is made higher than the temperature at the time of NOx release, or the degree of richness in the exhaust passage 20 is made to be a strongly rich state, and a sulfur release processing is performed to release SOx (sulfur component).

Hydrogen sulfide (H2S) may be generated when the sulfur release for releasing a sulfur component is performed. In particular, in a strongly rich state, in the case where the temperature of the NOx catalyst 22 is high and the amount of the released sulfur component is large, or in the case where the amount of SOx adhering to the NOx catalyst 22 is large and the amount of the released sulfur component is large, the released SOx, more specifically, SO2 (sulfur dioxide) is combined with hydrogen in the exhaust gas to easily generate hydrogen sulfide.

Figure 3:
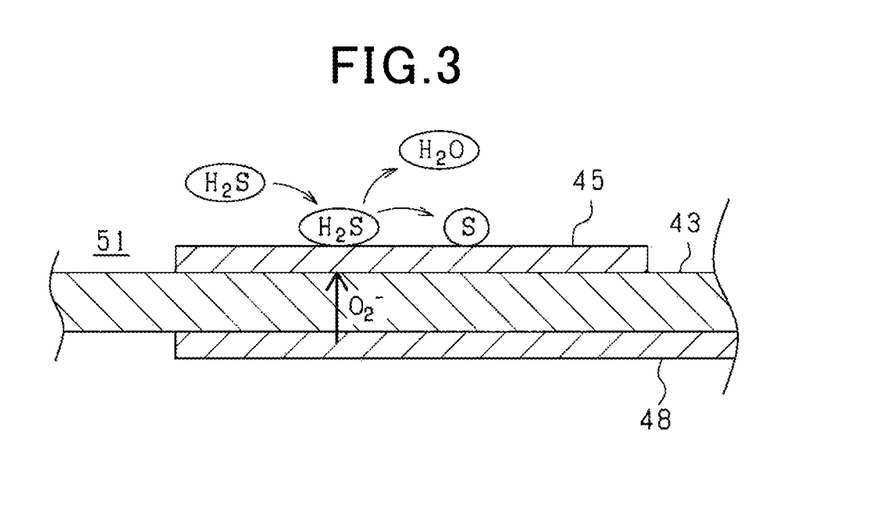
FIG. 3 is a diagram showing a state in which sensor poisoning occurs in a sulfur release state.

When hydrogen sulfide flows downstream of the NOx catalyst 22, the NOx sensor 27 provided downstream of the NOx catalyst 22 may be poisoned by sulfur. FIG. 3 is a diagram for explaining a state in which poisoning by sulfur occurs in the pump cell electrode 45 in a sulfur release state in the NOx sensor 27. In the following description, the pump cell electrode 45 is taken as an example, but there is a possibility that an electrode exposed to exhaust gas and containing oxygen, such as the monitor cell electrode 47, may be poisoned by sulfur.

When the NOx sensor 27 can detect NOx, the gas chamber 51 is held at a predetermined low oxygen concentration. Specifically, when the exhaust passage 20 is in a lean state, oxygen in the gas chamber 51 is ionized by the pump cell electrode 45 and discharged to the common electrode 48 side. On the other hand, when the exhaust passage 20 is in a rich state, the ionized oxygen is supplied from the common electrode 48 side to the pump cell electrode 45 side. The oxygen concentration in the gas chamber 51 is maintained at a constant low oxygen state. In order to maintain such a state, a voltage is applied between the pump cell electrode 45 and the common electrode 48, and oxygen is present on the pump cell electrode 45.

When hydrogen sulfide is present in the exhaust gas introduced into the gas chamber 51, oxygen (oxygen ions) on the pump cell electrode 45 reacts with hydrogen sulfide (xH2S+O (2−)→xH2O+x/nSn). Sulfur remains on the surface of the pump cell electrode 45, and the pump cell electrode 45 may be poisoned. That is, when hydrogen sulfide is present in the exhaust gas, sulfur remains on the surface of the pump cell electrode 45, and the pump cell electrode 45 may be poisoned.

When SO2 is present in the exhaust gas introduced into the gas chamber 51, oxygen and SO2 on the pump cell electrode 45 do not react very much. Even if it is reacted, only SO3 is formed, and sulfur does not remain on the pump cell electrode 45. Therefore, when SO2 is present in the exhaust gas, poisoning does not occur in the pump cell electrode 45.

Figure 4:
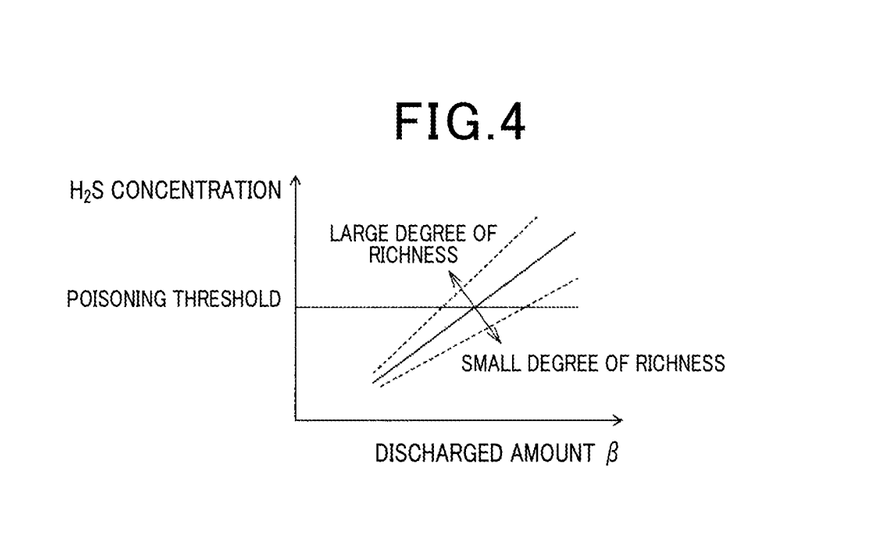
FIG. 4 is a diagram showing the relationship between the amount of sulfur released and H2S concentration.

The presence or absence of hydrogen sulfide in the exhaust gas is related to the release amount β of the sulfur component released by the sulfur release processing. FIG. 4 is a diagram showing the relationship between the released amount β of the sulfur component and the H2S concentration. When the released amount β of the sulfur component from the NOx catalyst 22 increases, the H2S concentration increases. When the H2S concentration is higher than a certain amount of concentration, the pump cell electrode 45 or the like may be poisoned. The poisoning threshold is the concentration of H2S that is likely to cause poisoning and may be calculated by experiments, etc. If the H2S concentration calculated from the released amount β exceeds the poisoning threshold value, the pump cell electrode 45 or the like may be poisoned.

The released amount β of the sulfur component indicates the amount of the sulfur component flowing from the NOx catalyst 22 to the downstream side per unit time and unit volume of the exhaust passage 20. The more the sulfur content β is released, the faster the sulfur content is released. The released amount β of the sulfur component is calculated based on the amount of the sulfur component adhering to the NOx catalyst 22 (sulfur adhesion amount Ai), the temperature of the NOx catalyst 22, and the rich degree of the exhaust gas. The relationship between the released amount β of the sulfur component and the H2S concentration is different depending on the richness degree in the exhaust passage 20, that is, the hydrogen concentration in the exhaust passage 20. Specifically, the higher the hydrogen concentration in the exhaust passage 20, the higher the H2S concentration in the same released amount β.

In the present embodiment, it is determined whether hydrogen sulfide is generated at a concentration equal to or higher than the poisoning threshold value when performing the sulfur release processing. When there is a high possibility that the hydrogen sulfide is generated at a concentration equal to or higher than the poisoning threshold, the NOx sensor 27 is stopped, and a reaction suppression processing for suppressing the reaction between the hydrogen sulfide and the oxygen on the electrode is performed.

The sulfur release processing of this embodiment includes a first release processing and a second release processing. The first release processing is performed under a first rich condition in which the exhaust passage 20 is in a weakly rich state to such an extent that a sulfur component is released, and a first temperature condition in which the temperature of the NOx catalyst 22 is the first temperature. The second release processing is performed by a second rich condition in which the exhaust passage 20 is in a strongly rich state having a richer degree than the first rich condition and a second temperature condition in which the temperature of the NOx catalyst 22 is a second temperature higher than the first temperature. When the sulfur adhesion amount Ai is larger than the first reference value, the first release processing is performed, while when the sulfur adhesion amount Ai is larger than the second reference value, the second release processing is performed.

The first reference value is a reference value for which it is judged desirable to perform the release of sulfur components. When the adhesion amount of the sulfur component to the NOx catalyst 22 becomes larger than the first reference value, the NOx storage performance of the NOx catalyst 22 deteriorates. Therefore, it is judged that it is desirable to release the sulfur component. The second reference value is larger than the first reference value, and is a reference value at which it is judged necessary to release the sulfur component from the NOx catalyst 22 immediately. When the amount of sulfur component adhering to the NOx catalyst 22 becomes larger than the second reference value, the NOx storage performance of the NOx catalyst 22 further deteriorates. Therefore, it is judged that it is necessary to release sulfur components. The first reference value and the second reference value are predetermined by experiments, and the like.

When the sulfur component is released from the NOx catalyst 22 by the first release processing, the hydrogen concentration in the exhaust gas is relatively low and the release speed of the sulfur component is slow. That is, the released amount β of the sulfur component is small and the richness degree is low. As a result, the released sulfur component, more specifically SO2, flows downstream without changing to hydrogen sulfide. Therefore, since the H2S concentration does not rise to the poisoning threshold, there is no risk of poisoning occurring in the pump cell electrode 45 or the like. Therefore, when the first release processing is performed, it is not necessary to stop the detection by the NOx sensor 27.

On the other hand, when the sulfur component is released from the NOx catalyst 22 by the second release processing, the hydrogen concentration in the exhaust gas is relatively high, and the release speed of the sulfur component is faster than that of the first release processing. That is, the released amount β of the sulfur component is large and the richness degree is high. As a result, in the second release processing, the released sulfur component, more specifically, SO2, is bonded to hydrogen in the exhaust gas to form hydrogen sulfide. Then, the H2S concentration in the exhaust gas rises to the poisoning threshold, and poisoning may occur in the pump cell electrode 45 or the like. Therefore, when the second release processing is carried out, it is necessary to stop the detection by the NOx sensor 27 and carry out the reaction suppression processing for suppressing the reaction between oxygen and sulfur components in the pump cell electrode 45.

Figure 5:
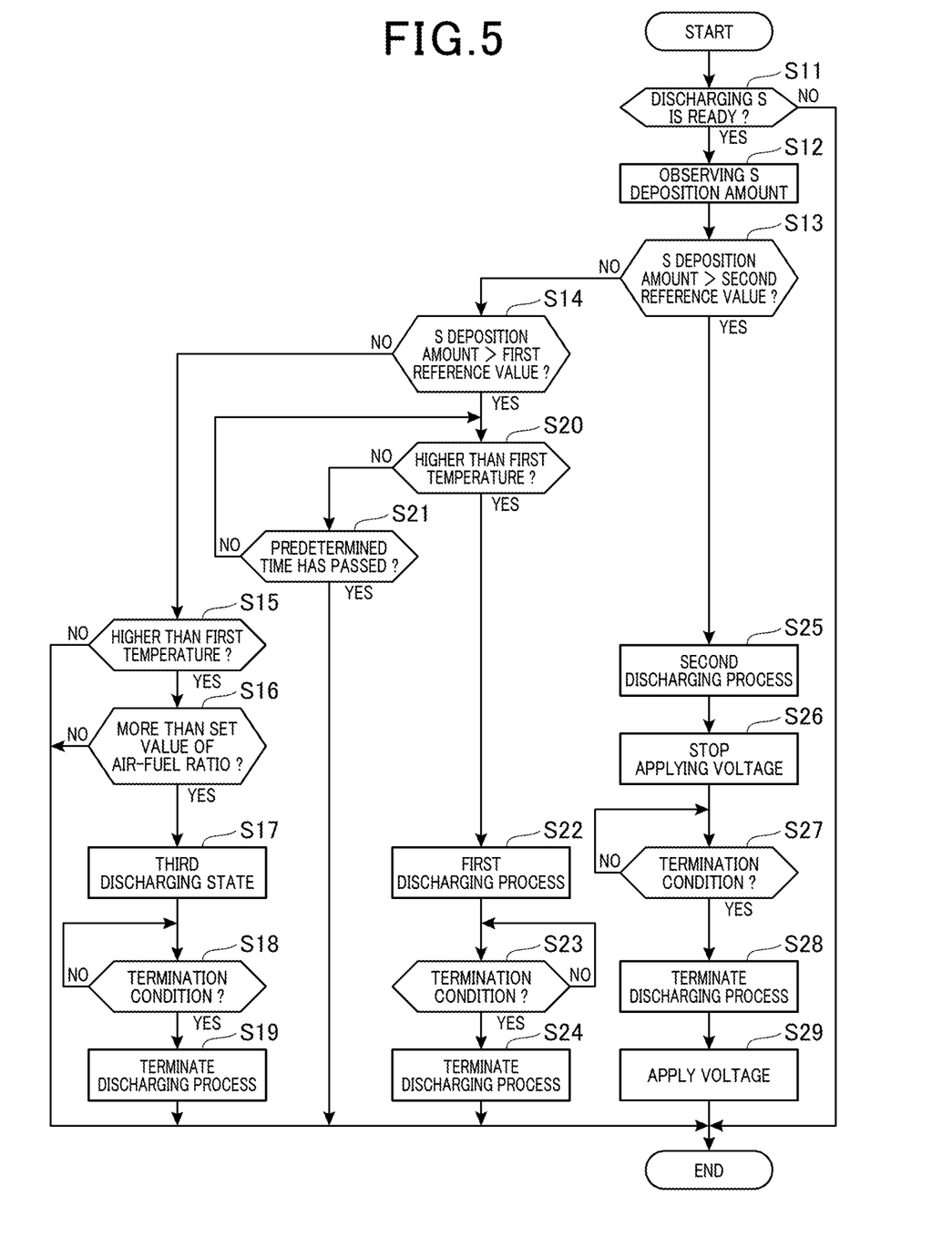
FIG. 5 is a flow chart for executing a sulfur release state.

FIG. 5 is a flowchart for executing the sulfur release processing. This processing is performed by the ECU 30 and the SCU 31 instructed by the ECU 30 at predetermined intervals.

In S11, it is determined whether the sulfur release processing can be performed. In other words, it is determined whether the sulfur release processing is prohibited. The prohibited state of the sulfur release processing means, for example, a state in which the engine 10 or the NOx catalyst 22 is warmed up, or a state in which any abnormality is diagnosed. When the sulfur release processing is prohibited, that is, when the sulfur release processing cannot be performed (S11=No), the processing is terminated. When the sulfur release processing is not prohibited, that is, when the sulfur release processing can be performed (S11=Yes), the process proceeds to S12.

Figure 6:
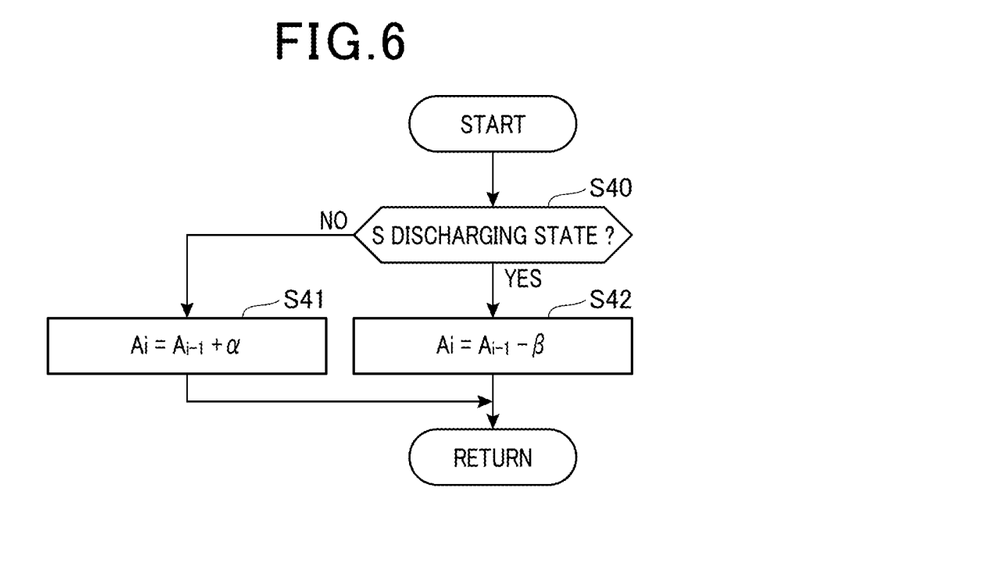
FIG. 6 is a flowchart for calculating the attachment amount of the sulfur component.

In S12, the amount of the sulfur component adhering to the NOx catalyst 22 is acquired as the sulfur adhesion amount Ai. The sulfur adhesion amount Ai is calculated by the processing of the flowchart of FIG. 6. FIG. 6 is a flowchart for calculating the attachment amount (sulfur attachment amount Ai) of the sulfur component. This process is performed by the ECU 30 at a predetermined cycle. The process in FIG. 6 corresponds to the "sulfur amount calculation unit".

In S40, it is determined whether it is in a sulfur release state. Here, the sulfur release state includes a state in which sulfur release is performed by either of the first release processing and the second release processing (first release state; second release state), and a third release state generated by the operating state of the engine 10. In these sulfur release states, the release flag is set to 1. The release flag is a flag indicating whether it is in the sulfur release state. The initial value of the emission flag is 0, and the release flag becomes 1 in these sulfur release states. If these sulfur release states are not present (S40=No), that is, if the release flag is 0, the process proceeds to S41.

In S41, the sulfur adhesion amount Ai is calculated. When the engine 10 is in a state of stable combustion and the sulfur release processing is not performed, the sulfur adhesion amount Ai increases. The increase amount α is added to the previously calculated sulfur adhesion amount A (i−1) to calculate the sulfur adhesion amount Ai. The increase amount α may be calculated based on the fuel injection amount in the fuel injection device 11 using a map or the like determined in advance by experiments or the like, or may be a fixed value. When the increase amount α is a variable value, the increase amount α increases as the amount of fuel injected and burned by the fuel injection device 11 increases. Further, the greater the amount of sulfur contained in the fuel, the greater the increase amount α.

In the case of the sulfur release state (S40=Yes), that is, when the release flag is 1, the sulfur adhesion amount Ai is calculated in S42. In S42, since the sulfur is released, the sulfur adhesion amount Ai decreases. The amount of released sulfur component (released amount β) is subtracted from the previously calculated sulfur adhesion amount A (i−1) to calculate the sulfur adhesion amount Ai. The released amount β is calculated based on the amount of sulfur components adhering to the NOx catalyst 22 (sulfur adhesion amount Ai), the temperature of the NOx catalyst 22, and the rich state of the exhaust gas by a map or the like calculated in advance in an experiment or the like. Specifically, the greater the sulfur adhesion amount Ai, the greater the released amount β; the higher the temperature of the NOx catalyst 22, the greater the released amount β; and the greater the richness degree in the exhaust passage 20, the greater the released amount β. Assuming that the released amount β is a fixed value, the sulfur attachment amount Ai may be calculated.

When the sulfur adhesion amount Ai is calculated in S41 or S42, the processing is terminated. Returning to the process of FIG. 5, in S12, the sulfur adhesion amount Ai calculated most recently by the process of FIG. 6 is acquired.

In S13, it is determined whether the sulfur adhesion amount Ai obtained in S12 exceeds the second reference value. If it is determined in S13 that the sulfur adhesion amount Ai does not exceed the second reference value (S13=No), the process proceeds to S14. In S14, it is determined whether the sulfur adhesion amount Ai exceeds the first reference value.

If it is determined in S14 that the sulfur adhesion amount Ai does not exceed the first reference value (S14=No), the process proceeds to S15. In S15 and S16, it is determined whether the engine 10 is in a predetermined third release state caused by the operating state of the engine. The processes in S15 and S16 correspond to the "determination unit".

Figure 7:
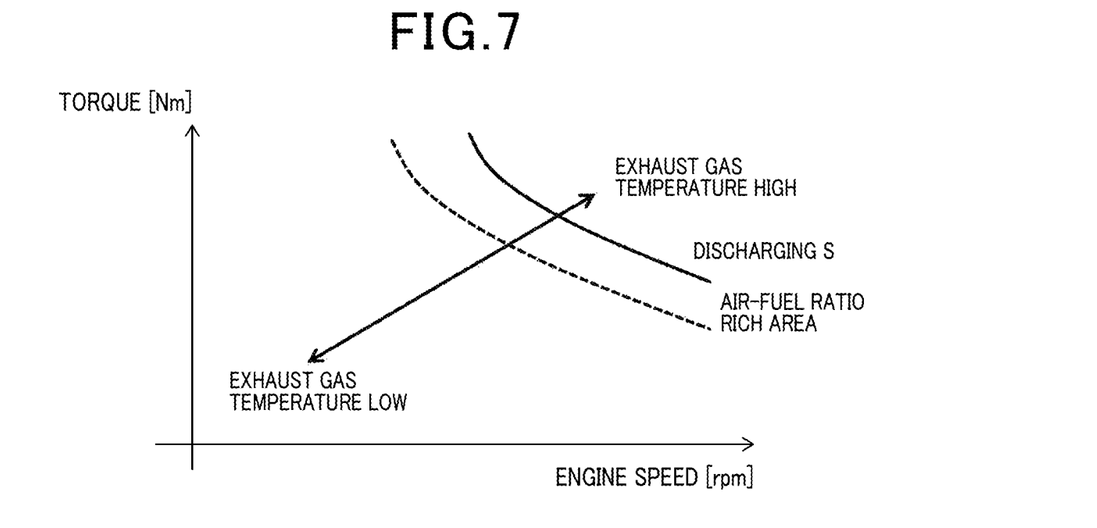
FIG. 7 is a diagram showing the relationship between the engine speed, the torque, the exhaust temperature, and the air-fuel ratio.

FIG. 7 is a diagram showing the relationship between the exhaust temperature and the air-fuel ratio in an engine operation region where the engine speed and the torque are two coordinates. In the case of high load and high rotation, the exhaust temperature increases. In order to suppress excessive temperature rise of the three-way catalyst 21 and the NOx catalyst 22 when the exhaust gas temperature rises, there is an operation region (upper right region of the broken line in FIG. 7) for enriching the air-fuel ratio during combustion. In this region, when the exhaust gas temperature further increases, a region (the region on the upper right of the solid line in FIG. 7) in which the sulfur release state occurs is formed. In this region, since the exhaust temperature is high, the temperature of the NOx catalyst 22 is also a temperature at which sulfur release occurs. In addition, since the air-fuel ratio of the combustion is rich, the degree of richness of the exhaust gas is suitable for allowing sulfur to be released. As described above, depending on the operation state, a sulfur release state may occur, and in this embodiment, the sulfur release state will be described as a third release state.

In S15, it is determined whether the temperature of the NOx catalyst 22 is equal to or higher than the first temperature. The first temperature is a minimum temperature at which sulfur is released, for example, about 600° C. The temperature of the NOx catalyst 22 may be the temperature detected by the temperature sensor 24 of the NOx catalyst 22, or the temperature of the NOx catalyst 22 may be estimated based on the operating state and the temperature detected by the exhaust air temperature sensor 25. When it is determined in S15 that the temperature of the NOx catalyst does not exceed the predetermined value (S15=No), that is, when the NOx catalyst 22 is not in the third release state according to the expected condition, the process is terminated.

When it is determined in S15 that the temperature of the NOx catalyst 22 exceeds a predetermined value (S15=Yes), the process proceeds to S16. In S16, it is determined whether the air-fuel ratio at the time of combustion is rich beyond the set value. The set value is an air-fuel ratio in which the inside of the exhaust passage 20 is in a rich state t suitable for a sulfur release state. It should be noted that an air-fuel ratio sensor may be provided in the exhaust passage 20 to determine whether the value of the air-fuel ratio sensor is richer than a predetermined value. When it is determined in S16 that the air-fuel ratio is not richer than the set value (S16=No), that is, when the air-fuel ratio is not in the third release state due to the transition, the process is terminated.

When it is determined in S16 that the air-fuel ratio is richer than the set value (S16=Yes), that is, when both the catalyst temperature and the degree of richness in the exhaust passage 20 are in a state where sulfur can be released, it is assumed in S17 that the state is the third release state. Concretely, the release flag is set to 1 on the assumption that the state is a sulfur release state.

In S18, it is determined whether the termination condition of the third release state is satisfied. Specifically, when the temperature of the NOx catalyst 22 becomes lower than the predetermined value or the air-fuel ratio becomes not richer than the set value, it is determined that the termination condition of the third release state is satisfied (S18=Yes). On the other hand, until the termination condition is satisfied, whether the termination condition is satisfied is determined in S18.

If it is determined in S18 that the termination condition is satisfied, the release state is terminated in S19. Specifically, the release flag is reset to 0, and the processing is terminated.

On the other hand, when it is determined in S14 that the sulfur adhesion amount Ai exceeds the first reference value (S14=Yes), the process proceeds to S20. In the first release processing executed when the first reference value is exceeded, the temperature of the NOx catalyst 22 is not controlled, but the richness degree in the exhaust passage 20 is controlled. In S20, it is determined whether the temperature of the NOx catalyst 22 is equal to or higher than the first temperature. The processes in S14 and S20 correspond to the "determination unit".

If it is determined in S20 that the temperature of the NOx catalyst 22 does not exceed the first temperature (S20=No), the process repeats S20 until it is determined in S21 that the predetermined time has elapsed. Specifically, when it is determined in S21 that the predetermined time has not elapsed (S21=No), the process returns to S20. On the other hand, if it is determined in S21 that the predetermined time has elapsed (S21=Yes), the process is terminated.

When it is determined in S20 that the temperature of the NOx catalyst 22 is equal to or higher than the first temperature (S20=Yes), the first release processing is executed in S22. Specifically, the release flag is set to 1 to set the first rich condition to be a weakly rich state capable of sulfur release in the exhaust passage 20. In order to place the exhaust passage 20 into a weakly rich state, the air-fuel ratio at the time of combustion may be set to a value such that unburned fuel is discharged into the exhaust passage 20, or the unburned fuel may be discharged into the exhaust passage 20 by post injection for injecting the fuel after combustion. A fuel supply valve may be provided in the exhaust passage 20 to inject fuel. When controlling the air-fuel ratio at the time of combustion, it is desirable to control the air-fuel ratio within a range that does not affect the operating state such as the rotational speed and the load. It is preferable that the first rich condition is a degree of richness to be satisfied when the air-fuel ratio is set to the set value in the third release state. The process in S22 corresponds to the "sulfur release control unit".

In S23, it is determined whether the termination condition of the first release processing is satisfied. More specifically, when the temperature of the NOx catalyst 22 is lower than the first temperature or the sulfur adhesion amount Ai is reduced after a certain time elapses after the start of the first release processing, it is determined that the termination condition of the first release processing is satisfied (S23=Yes). On the other hand, until the termination condition is satisfied, whether the termination condition is satisfied is determined in S23.

If it is determined in S23 that the termination condition is satisfied, the release processing is terminated in S24. Specifically, the release flag is reset to 0 to complete the first rich condition, and the processing is terminated.

When it is determined in S13 that the sulfur adhesion amount Ai exceeds the second reference value (S13=Yes), the process proceeds to S25. In the second release processing performed when the second reference value is exceeded, the temperature of the NOx catalyst 22 and the degree of richness in the exhaust passage 20 are controlled. Note that S13 corresponds to "determination unit".

In S25, the second release processing is executed. Specifically, the release flag is set to 1, the temperature of the NOx catalyst 22 is increased, and the inside of the exhaust passage 20 is set to a second rich condition which is a strongly rich state having a richer degree than the first rich condition. In the second release processing, the temperature of the NOx catalyst 22 is raised regardless of the operation state, and the inside of the exhaust passage 20 is made into a strongly rich state. In addition, S25 corresponds to "sulfur release control unit".

In order to raise the temperature of the NOx catalyst 22, the exhaust temperature is raised or combustion is generated in the catalyst by post injection. Then, the temperature of the NOx catalyst 22 is increased to a second temperature higher than the first temperature, for example, 650° C. to 700° C. The temperature of the NOx catalyst 22 may be increased by providing a heater in the NOx catalyst 22 and controlling the energization of the heater.

In order to make the exhaust passage 20 strongly rich, the air-fuel ratio during combustion may be set to a value such that unburned fuel is discharged into the exhaust passage 20, or the unburned fuel may be discharged into the exhaust passage 20 by post injection. A fuel supply valve may be provided in the exhaust passage 20 to inject fuel.

In the second release processing, the release of the sulfur component from the NOx catalyst 22 is given priority over the suppression of the generation of hydrogen sulfide, and hydrogen sulfide flows downstream of the NOx catalyst 22. Therefore, when oxygen is present on the pump cell electrode 45 of the NOx sensor 27, there is a possibility that the pump cell electrode 45 is poisoned by reacting with hydrogen sulfide.

Therefore, in S26, as the reaction suppression processing, the voltage application to the pump cell electrode 45 and the common electrode 48 is stopped so that no oxygen is present on the pump cell electrode 45. In addition, it is preferable that not only the pump cell electrode 45 but also an electrode on the side of the gas chamber 51 (an electrode exposed to exhaust gas) stop voltage application to an electrode at which oxygen is present. It should be noted that the application of a voltage causing the movement of oxygen ions from the common electrode 48 to the pump cell electrode 45 may be stopped. Specifically, a voltage may be applied to cause the movement of oxygen ions from the pump cell electrode 45 to the common electrode 48 side so that oxygen does not remain on the pump cell electrode 45. The method of stopping the voltage application is excellent in responsiveness. The process in S26 corresponds to the "reaction suppression unit".

In addition, instead of stopping the voltage application to the pump cell electrode 45 and the common electrode 48 in S26, the temperature of the solid electrolyte 43 may be lowered from the active temperature as a reaction suppression process. Specifically, the energization to the heater 49 is stopped, and the temperature of the solid electrolyte 43 is lowered to, for example, about 300° C. to 400° C. The movement of oxygen in the solid electrolyte 43 is prevented so that no oxygen is present in the pump cell electrode 45. When the temperature of the solid electrolyte 43 is lowered, the temperature of the pump cell electrode 45 is also lowered. When the temperature of the pump cell electrode 45 is lowered, the reaction between hydrogen sulfide and oxygen hardly occurs. Further, as the reaction suppression processing, a processing may be performed in which the temperature of the solid electrolyte 43 is lower than the active temperature while the voltage application is stopped.

In S27, it is determined whether the termination condition of the second release processing is satisfied. More specifically, when the sulfur adhesion amount Ai decreases after a certain time elapses after the start of the second release processing, it is determined that the condition for terminating the second release processing is satisfied (S27=Yes). On the other hand, until the termination condition is satisfied, whether the termination condition is satisfied is determined in S27.

If it is determined in S27 that the termination condition is satisfied, the release processing is terminated in S28. Specifically, the release flag is reset to 0. Further, the temperature of the NOx catalyst 22 is set to the second temperature, and the richness degree in the exhaust passage 20 is set to a strongly rich state.

In S29, the reaction suppression process at the NOx sensor 27 is stopped. More specifically, the application of the voltage to the pump cell electrode 45 and the common electrode 48 is restarted. When the temperature of the solid electrolyte 43 is lowered in S26, the energization to the heater 49 is resumed to raise the temperature of the solid electrolyte 43 to the active temperature. Then, the use of the NOx sensor 27 is resumed to terminate the process. Since the NOx sensor 27 cannot normally detect the detection gas immediately after the reaction suppression process is stopped, it is desirable to resume the use of the NOx sensor 27 after a predetermined delay time.

Figure 8:
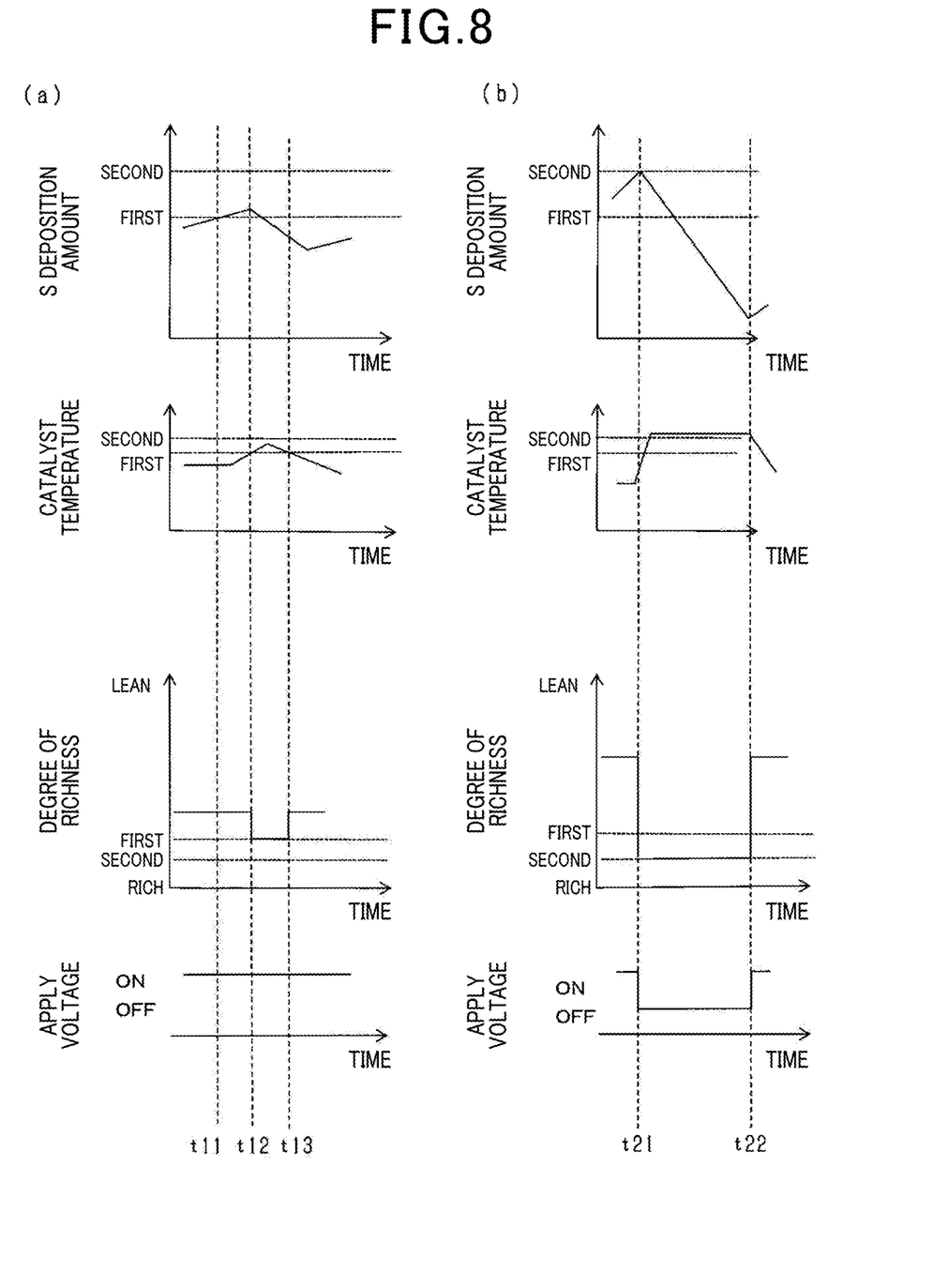
FIG. 8 is timing diagrams each showing the adhesion amount of sulfur components.

FIG. 8 is a time chart showing the adhesion amount of sulfur components in this embodiment. FIG. 8(a) is a time chart for the first release processing, and FIG. 8(b) is a time chart for the second release processing.

The first release processing will be described with reference to FIG. 8(a). At timing t11, the sulfur adhesion amount Ai exceeds the first reference value. In this case, since the temperature of the NOx catalyst 22 is not controlled in the first release control when exceeding the first reference value, it is determined whether the temperature of the NOx catalyst 22 is higher than the first temperature.

When the temperature of the NOx catalyst 22 becomes higher than the first temperature at timing t12, the air-fuel ratio during combustion is controlled so that the degree of richness in the exhaust passage 20 satisfies the first rich condition. When the richness degree in the exhaust passage 20 satisfies the first rich condition, the state of sulfur release is established, and the sulfur adhesion amount Ai gradually decreases. In the first release processing, since the sulfur adhesion amount Ai is not large and the catalyst temperature is not high, the release speed is slow. Since the degree of richness is also small, hydrogen sulfide is hardly produced. That is, the released amount β is smaller than the predetermined amount, and the degree of richness is smaller than the predetermined amount, so that the poisoning threshold is not exceeded. Therefore, during the first release processing, voltage application between the pump cell electrode 45 and the common electrode 48 of the NOx sensor 27 is continued, and detection by the NOx sensor 27 is continued. That is, when the possibility of being poisoned by sulfur is small, the reaction suppression processing is not performed, and the period during which the NOx sensor 27 cannot be used is minimized.

When the temperature of the NOx catalyst 22 is lower than the first temperature at timing t13, the first release processing is terminated. When the temperature of the NOx catalyst 22 decreases, the air-fuel ratio at the time of combustion is set to the air-fuel ratio based on the operating state. Then, the rich degree in the exhaust passage 20 does not satisfy the first rich condition, and the sulfur release state is terminated.

The second release processing will be described with reference to FIG. 8(b). At timing t21, the sulfur adhesion amount Ai exceeds the second reference value. In the second release processing when the second reference value is exceeded, the temperature of the NOx catalyst 22 and the richness degree in the exhaust passage 20 are controlled. Therefore, when the temperature exceeds the second reference value, the temperature of the NOx catalyst 22 is raised to the second temperature. The air-fuel ratio at the time of combustion is controlled so that the rich degree in the exhaust passage 20 satisfies the second rich condition. Then, a sulfur release state is achieved, and the sulfur adhesion amount Ai decreases.

In the second release processing, the release speed is fast because the sulfur adhesion amount Ai is large and the catalyst temperature is high. Further, since the degree of richness is large, hydrogen sulfide may be generated. That is, since the released amount β is larger than the predetermined amount and the richness degree is richer than the predetermined amount, the poisoning threshold is exceeded. Therefore, if the NOx sensor 27 is continuously used during the second release process, the NOx sensor 27 may be poisoned by sulfur. Therefore, during the second release processing (from timing t21 to timing t22), the application of the voltage between the pump cell electrode 45 and the common electrode 48 of the NOx sensor 27 is stopped. That is, when there is a possibility of poisoning by sulfur, reaction suppression processing is performed to suppress poisoning of the NOx sensor 27.

When a predetermined time elapses from the start of the second release processing at timing t22, the second release processing is terminated. Specifically, the control for raising the temperature of the NOx catalyst 22 is stopped, and the air-fuel ratio at the time of combustion is made to be an air-fuel ratio based on the operating state. Then, the temperature of the NOx catalyst 22 decreases, the degree of richness in the exhaust passage 20 does not satisfy the second rich condition, and the sulfur release state is terminated. The application of the voltage between the pump cell electrode 45 and the common electrode 48 of the NOx sensor 27 is restarted, and the detection of the NOx sensor 27 is restarted. It is preferable that the detection of the NOx sensor 27 is restarted after a predetermined delay time has elapsed.

In the embodiment described above, the following effects are obtained.

In the sulfur release state, a reaction suppression processing for suppressing the reaction between oxygen and sulfur components, more specifically, hydrogen sulfide in the pump cell electrode 45 is performed. Thus, poisoning due to residual sulfur can be suppressed.

As a reaction suppression processing, voltage application to the pump cell electrode 45 and the common electrode 48 is stopped to prevent oxygen from being present on the pump cell electrode 45. Thus, reaction with hydrogen sulfide is suppressed and poisoning can be suppressed. It should be noted that a method of stopping voltage application to the pump cell electrode 45 and the common electrode 48 is preferable in terms of responsiveness.

The temperature of the solid electrolyte 43 is made lower than the active temperature so that oxygen does not migrate within the solid electrolyte 43, so that oxygen is not present on the pump cell electrode 45. Thus, reaction with hydrogen sulfide is suppressed and poisoning can be suppressed. When the temperature of the solid electrolyte 43 is lowered, the temperature of the pump cell electrode 45 is also lowered. When the temperature of the pump cell electrode 45 is lowered, the reaction between hydrogen sulfide and oxygen is less likely to occur, so that poisoning can be further suppressed.

While suppressing the generation of hydrogen sulfide by setting the exhaust passage 20 to a weakly rich state, reaction suppression processing is not performed and detection is performed by the NOx sensor 27. On the other hand, when there is a high possibility that a large amount of hydrogen sulfide flows in the exhaust passage 20 in a strongly rich state, the poisoning of the NOx sensor 27 can be suppressed by performing the reaction suppression processing. That is, by performing the reaction suppression processing when necessary while minimizing the period during which the reaction suppression processing is performed (the period during which the use of the NOx sensor 27 is stopped), poisoning of the NOx sensor 27 can be suppressed.

The second release processing is performed according to a rich condition in which the exhaust passage 20 is in a strongly rich state and a temperature condition in which the temperature of the NOx catalyst 22 is the second temperature. Thus, when the second release processing is performed, the amount of hydrogen in the exhaust gas becomes relatively large or the release speed of the sulfur component becomes faster than that of the first release processing. As a result, in the second release processing, while the sulfur component can be efficiently released from the NOx catalyst 22, the released sulfur component, more specifically, SOx (sulfur oxide), may be combined with hydrogen or the like in the exhaust gas to form hydrogen sulfide (H2S).

On the other hand, the first release processing is performed under a rich condition in which the exhaust passage 20 is in a weakly rich state and a temperature condition in which the temperature of the NOx catalyst 22 becomes the first temperature. Thus, when the first release processing is performed, the amount of hydrogen in the exhaust gas becomes relatively small or the release speed of the sulfur component becomes low, so that the released sulfur component, more specifically, SOx (sulfur oxide) flows downstream.

Therefore, during the second release processing, a reaction suppression processing for suppressing the reaction between oxygen and sulfur components in the pump cell electrode 45 and the monitor cell electrode 47 of the NOx sensor 27 is performed. Thus, poisoning of the pump cell electrode 45 and the monitor cell electrode 47 can be suppressed.

When the amount of the sulfur component adhering to the NOx catalyst 22 increases, the performance of the NOx catalyst 22 deteriorates, therefore, it is necessary to release the sulfur component. However, while hydrogen sulfide is less likely to be generated in the first release processing, the amount of the released sulfur component decreases, so that the first release processing is not desirable when the amount of the attached sulfur component increases. Therefore, when the sulfur adhesion amount Ai is larger than the first reference value, the first release processing is performed in order to prioritize the poisoning suppression of the NOx sensor 27. On the other hand, when the sulfur adhesion amount Ai exceeds the second reference value, the second release processing is performed in order to give priority to the release of the sulfur component. Thus, it is possible to take measures corresponding to the sulfur adhesion amount Ai.

The poisoning of the NOx sensor 27 can be suppressed by performing the reaction suppression processing on the condition that the adhesion amount (sulfur adhesion amount Ai) of the sulfur component adhering to the NOx catalyst 22 is larger than a predetermined amount (second reference value). That is, by performing the reaction suppression processing when necessary while minimizing the period during which the reaction suppression processing is performed (the period during which the use of the NOx sensor 27 is stopped), poisoning of the NOx sensor 27 can be suppressed.

Other Embodiments

The present disclosure is not limited to the above-described embodiment, and may be implemented as follows.

Based on the storage rate of the NOx catalyst 22, it may be selected whether the sulfur release processing is performed or whether the release processing is performed by the first release processing or the second release processing. The storage rate of the NOx catalyst 22 can be calculated based on a well-known method, for example, by detecting the NOx amount on the upstream side and the NOx amount on the downstream side of the NOx catalyst 22. When the storage rate of the NOx catalyst 22 is lower than the predetermined value, the first release processing may be performed. In addition, it is desirable to perform the second release processing when the storage rate further decreases.

The second release processing may be carried out when the integrated value of the released amount β during the period of carrying out the first release processing is small or when the first release processing cannot be performed. Specifically, in S23 of the process shown in FIG. 5, when the temperature of the NOx catalyst 22 is lowered and the process is terminated before a predetermined time elapses, the integrated value of the released amount β during the first release processing may be small. In this case, a forcing flag may be set to 1 and if the forcing flag is 1 in S13, the process may proceed to S25. The forcing flag is a flag for indicating that the second release processing needs to be performed, and its initial value is 0. When the temperature of the NOx catalyst 22 does not rise and the first release processing cannot be performed after a predetermined time elapses in S21, the forcing flag may be set to 1, and similar process may be performed. It should be noted that determination as to whether the second release processing is to be performed may be made based on the storage rate after the first release processing. Specifically, when the storage rate after the first release processing is performed is lower than a predetermined value, it is determined that the sulfur component is not sufficiently released by the first release processing, and the second release processing may be performed.

The temperature of the NOx catalyst 22 may also be controlled in the first release processing. Specifically, when the sulfur adhesion amount Ai exceeds the first reference value, the temperature of the NOx catalyst 22 may be controlled to rise to the first temperature. In the first release processing, the temperature of the NOx catalyst 22 may be controlled so as to be raised to the first temperature. Therefore, there is no need to control the air-fuel ratio.

In the second release processing, only either the temperature of the NOx catalyst 22 or the richness degree in the exhaust passage 20 may be controlled. When controlling the temperature of the NOx catalyst 22, it is preferable to control the temperature of the NOx catalyst 22 so as to be raised to the second temperature. In the case of controlling the degree of richness, it is preferable to control the inside of the exhaust passage so as to satisfy the second rich condition in which the inside of the exhaust passage 20 is in a strongly rich state.

The reaction suppression processing may be performed even in the first release state and the third release state by the first release processing. In this case, poisoning is more reliably suppressed.

Figure 9:
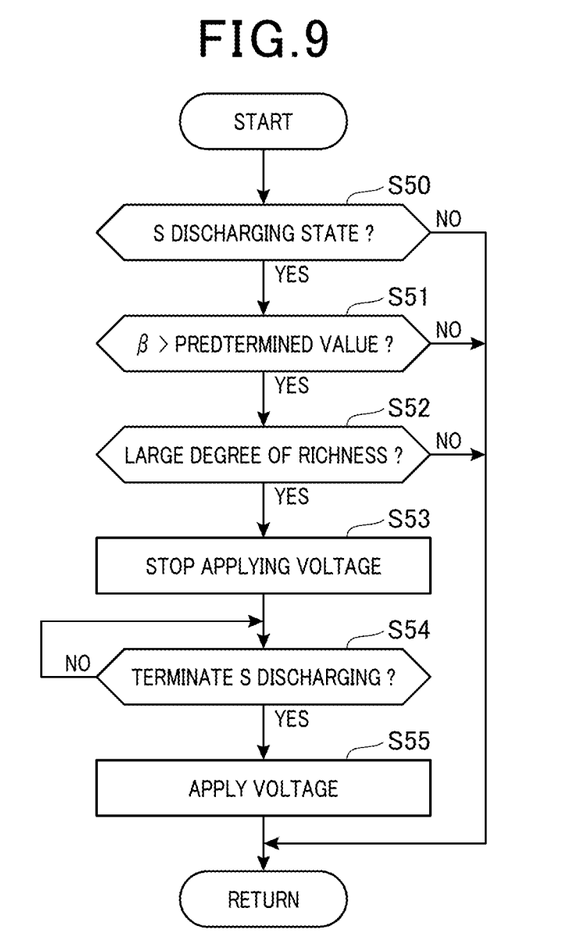
FIG. 9 is a flowchart for determining whether reaction suppression processing according to another embodiment is to be executed.

Determination of whether the reaction suppression processing should be performed may be made based on the release amount β and the richness degree in the exhaust passage 20. Specifically, as shown in FIG. 9, the reaction suppression processing may be performed on the condition that the released amount β is greater than a predetermined value and the richness degree is richer than the predetermined value. FIG. 9 is a flowchart for determining whether the reaction suppression process is to be executed. The reaction suppression process is executed at a predetermined cycle by the ECU 31 and the SCU 31 that has received instructions from the ECU 30.

In S50, it is determined whether it is in the state of sulfur release. Specifically, it is determined whether the release flag is 1. The release flag is set to "1" when the first release processing is performed in S22, the second release processing is performed in S25, or when the third release processing is performed in S17 in FIG. 5. When it is determined in S50 that the state is not the sulfur release state (S50=No), the process is terminated.

When it is determined in S50 that it is in the state of sulfur release (S50=Yes), then it is determined in S51 whether the released amount β is larger than a predetermined value. Specifically, it is determined whether the estimated-released amount β is larger than a predetermined value based on the sulfur adhesion amount Ai, the temperature of the NOx catalyst 22, and the rich degree of the exhaust gas. The predetermined value is an amount which is determined not to exceed the poisoning threshold regardless of the degree of richness if the released amount β is smaller than the predetermined value. That is, when the released amount β exceeds a predetermined value, the poisoning threshold may be exceeded depending on the richness degree. In the first place, hydrogen sulfide is hardly generated when the released amount β is small. Therefore, when the released amount β is small, the possibility of the formation of hydrogen sulfide is low. When it is determined in S51 that the released amount β is smaller than the predetermined value (S51=No), the process is terminated. The configuration for estimating the released amount β in S51 corresponds to the "released amount estimation unit".

When it is determined in S50 that the state of sulfur release is present (S50=Yes), then it is determined in S51 whether the released amount β is larger than a predetermined value. The degree of richness may be estimated based on the amount of fuel injected by the fuel injection device 11 or, if an air-fuel ratio sensor is provided in the exhaust passage 20, based on the detected value. As shown in FIG. 4, a predetermined richness exceeding the poisoning threshold is determined for each released amount β. Based on the released amount β and the rich degree, when the poisoning threshold is exceeded, it is judged that the rich degree is richer than a prescribed one. On the other hand, when the degree of richness is lower than the predetermined richness in the released amount β (S52=No), the process is terminated. The configuration for estimating the rich degree in S52 corresponds to the "rich degree estimation unit".

If it is determined in S52 that the degree of richness is richer than the predetermined level (S52=Yes), the process proceeds to S53. In S53, as a reaction suppression processing, voltage application to the pump cell electrode 45 and the common electrode 48 is stopped to prevent oxygen from being present on the pump cell electrode 45. In S54, it is determined whether the sulfur release state has been terminated. Specifically, when the release flag becomes 0, it is determined that the sulfur release processing is completed (S54=Yes). On the other hand, until the sulfur release state is terminated, it is determined in S54 whether the sulfur release state should be terminated.

When it is determined in S54 that the sulfur release processing is completed, in S55, the reaction suppression processing in the NOx sensor 27 is stopped. Specifically, the application of the voltage to the pump cell electrode 45 and the common electrode 48 is restarted.

When the released amount β and the richness exceed the poisoning threshold, the reaction suppression processing may be performed. Thus, the reaction suppression processing can be carried out only when necessary to suppress poisoning. In the second release processing, since the released amount β is larger than the predetermined value and the richness degree is richer in the strongly rich state, there is a possibility that the poisoning may occur beyond the poisoning threshold. Therefore, even when the determination is made based on the released amount β and the richness degree, it is necessary to perform the reaction suppression processing in the second release processing.

Whether the reaction suppression processing is performed may be determined based on the sulfur adhesion amount Ai. That is, when the sulfur adhesion amount Ai is larger than a predetermined amount regardless of the temperature of the NOx catalyst 22 or the degree of richness in the exhaust passage 20, the reaction suppression processing may be performed. Specifically, when the sulfur adhesion amount Ai exceeds a predetermined amount, for example a value larger than the first reference value, the reaction suppression processing may be performed. When the sulfur adhesion amount Ai is large, the released amount β of the sulfur component released to the downstream side increases, and the possibility of the generation of hydrogen sulfide increases. Therefore, when the sulfur adhesion amount Ai is larger than the predetermined amount, the reaction suppression processing is performed.

Whether to execute the reaction suppression processing may be determined based on the richness degree in the exhaust passage 20. That is, when the degree of richness is large regardless of the temperature of the NOx catalyst 22 or the sulfur adhesion amount Ai, the reaction suppression processing may be performed. Specifically, in the case of the second rich condition in which the exhaust passage 20 is in a strongly rich state, the reaction suppression process may be performed. When the richness degree is large, the released amount β of the sulfur component released to the downstream side is large, and the hydrogen concentration in the exhaust passage 20 is also high, so that the possibility of generation of hydrogen sulfide is high. Therefore, in the case of release processing under the second rich condition, reaction suppression processing is performed.

As the reaction suppression processing, a structure such as a shutter for preventing exhaust gas from being supplied into the gas chamber 51 may be provided, and the reaction between hydrogen sulfide and oxygen may be suppressed by closing the shutter. Further, a structure such as a shutter may be provided to prevent air from being supplied into the reference chamber 52, and the structure may be closed to suppress the reaction between hydrogen sulfide and oxygen.

When sulfur release processing is performed in the three-way catalyst 21, the reaction suppression processing may be performed by the NOx sensor 26. In the case of a limiting current type gas sensor provided on the downstream side of the catalyst on which the sulfur release processing is performed, any gas sensor may perform the reaction suppression processing.

The controller and method described in this disclosure may be implemented by a dedicated computer provided by configuring a processor and memory programmed to perform one or more functions embodied by a computer program. Alternatively, the controller and method described in this disclosure may be implemented by a dedicated computer provided by configuring a processor with one or more dedicated hardware logic circuits. Alternatively, controller and method described in the present disclosure may be implemented by one or more dedicated computers configured by a combination of a processor and memory programmed to perform one or more functions and a processor configured by one or more hardware logic circuits. The computer program may also be stored in a computer-readable non-transitive tangible recording medium as instructions to be executed by a computer.

The present disclosure has been described in accordance with the embodiment, but the present disclosure should in no way be construed as being limited to the above embodiments, the configuration, and the like. The present disclosure includes many variations, and modifications within the range of equivalency. In addition to various combinations and forms, other combinations and forms including one or more/less elements thereof are also within the spirit and scope of the present disclosure.

CONCLUSION

The present disclosure provides a control device for an exhaust system capable of minimizing poisoning of a gas sensor.

The present disclosure relates to a control device applied to an exhaust system includes: a catalyst provided in an exhaust passage of an internal combustion engine, having adhered thereto sulfur components in the exhaust gas and releasing the adhered sulfur components using rich components contained in the exhaust gas; and a gas sensor provided on the downstream side of the catalyst. In the control device, the gas sensor has a solid electrolyte, an exhaust side electrode provided on the exhaust side of the solid electrolyte, and a reference side electrode provided on the reference chamber side, and detects a specific gas component by causing migration of oxygen ions in the solid electrolyte by applying a voltage to the exhaust side electrode and the reference side electrode, and the control device includes: a determination unit that determines whether the operating state of the internal combustion engine is a sulfur release state in which the sulfur component is released from the catalyst; and, a reaction suppression unit that performs a reaction suppression processing to suppress the reaction between oxygen and the sulfur component at the exhaust side electrode of the gas sensor when it is determined that the gas sensor is in the sulfur release state.

In a sulfur release state in which a sulfur component is released from a catalyst by a rich component in exhaust gas, the released sulfur component, more specifically, SOx (sulfur oxide), may combine with hydrogen or the like in exhaust gas to form hydrogen sulfide (H2S). On the other hand, when the gas sensor detects a specific gas component, oxygen and oxygen ions are present on the exhaust side electrode due to the migration of oxygen ions in the solid electrolyte accompanying the application of voltage. When hydrogen sulfide flows in a state where oxygen exists on the exhaust-side electrode, oxygen ions react with hydrogen sulfide, and sulfur remains on the surface of the exhaust-side electrode, and the exhaust-side electrode may be poisoned. Therefore, in the sulfur release state, a reaction suppression process is performed to suppress the reaction between oxygen and sulfur components in the exhaust side electrode, more specifically, hydrogen sulfide. Thus, poisoning due to residual sulfur can be suppressed.

What is claimed is:

1. A control device for an exhaust system, the exhaust system comprising:
   a catalyst provided in an exhaust passage of an internal combustion engine and having sulfur components in exhaust as adhered thereto, and releasing the adhered sulfur components by rich components in exhaust gas; and
   a gas sensor provided on a downstream side of the catalyst,
   wherein
   the gas sensor is configured as a limiting current sensor having a solid electrolyte, an exhaust side electrode provided on an exhaust side of the solid electrolyte, and a reference side electrode provided on a reference chamber side, and detects a specific gas component by causing a movement of oxygen ions in the solid electrolyte by applying a voltage to the exhaust side electrode and the reference side electrode:

the control device including:

a determination unit that determines whether an operating state of the internal combustion engine is a sulfur release state in which the sulfur components are released from the catalyst; and a reaction suppression unit that performs a reaction suppression processing to suppress the reaction between oxygen and the sulfur components at the exhaust side electrode of the gas sensor when the determination unit determines that the gas sensor is in the sulfur release state, the reaction suppression unit performs a process of stopping voltage application to the exhaust side electrode and the reference side electrode or a process of stopping voltage application to cause movement of oxygen ions from the reference side electrode to the exhaust side electrode as the reaction suppression processing, and the reaction suppression unit performs a process of lowering the temperature of the solid electrolyte below the active temperature as the reaction suppression processing.

2. The control device for the exhaust system according to claim 1 further comprising:

a release amount estimation unit that estimates the released amount of the sulfur component released from the catalyst in the sulfur release state; and a rich degree estimation unit that estimates the rich degree in the exhaust passage, wherein the reaction suppression unit performs the reaction suppression processing based on the released amount and the richness degree.

3. The control device for the exhaust system according to claim 2, further comprising a sulfur amount calculation unit that calculates the amount of the sulfur component adhered to the catalyst as the sulfur adhesion amount, wherein the reaction suppression unit performs the reaction suppression processing on the condition that the sulfur adhesion amount is greater than a predetermined amount.

4. A control device for an exhaust system, the exhaust system comprising:

a catalyst provided in an exhaust passage of an internal combustion engine and having sulfur components in exhaust gas adhered thereto, and releasing the adhered sulfur components by rich components in exhaust gas; and a gas sensor provided on a downstream side of the catalyst, wherein the gas sensor is configured as a limiting current sensor having a solid electrolyte, an exhaust side electrode provided on an exhaust side of the solid electrolyte, and a reference side electrode provided on a reference chamber side, and detects a specific gas component by causing a movement of oxygen ions in the solid electrolyte by applying a voltage to the exhaust side electrode and the reference side electrode; and the control device including:

a determination unit that determines whether an operating state of the internal combustion engine is a sulfur release state in which the sulfur components are released from the catalyst; and, a reaction suppression unit that performs a reaction suppression processing to suppress the reaction between oxygen and the sulfur components at the exhaust side electrode of the gas sensor when the determination unit determines that the gas sensor is in the sulfur release state, the reaction suppression unit performs a process of lowering the temperature of the solid electrolyte below the active temperature as the reaction suppression processing.

5. A control device for an exhaust system, the exhaust system comprising:

a catalyst provided in an exhaust passage of an internal combustion engine and having sulfur components in exhaust gas adhered thereto, and releasing the adhered sulfur components by rich components in exhaust gas; and a gas sensor provided on a downstream side of the catalyst, wherein the gas sensor is configured as a limiting current sensor having a solid electrolyte, an exhaust side electrode provided on an exhaust side of the solid electrolyte, and a reference side electrode provided on a reference chamber side, and detects a specific gas component by causing a movement of oxygen ions in the solid electrolyte by applying a voltage to the exhaust side electrode and the reference side electrode; and the control device including:

a determination unit that determines whether an operating state of the internal combustion engine is a sulfur release state in which the sulfur components are released from the catalyst; and, a reaction suppression unit that performs a reaction suppression processing to suppress the reaction between oxygen and sulfur components at the exhaust side electrode of the gas sensor when the determination unit determines that the gas sensor is in the sulfur release state, the reaction suppression unit performs a process of stopping voltage application to the exhaust side electrode and reference side electrode or a process of stopping voltage application to cause movement of oxygen ions from the reference side electrode to the exhaust side electrode as the reaction suppression processing, the control device further including:

a sulfur release control unit that releases sulfur components attached to the catalyst by making the exhaust passage rich with unburned fuel, wherein the sulfur release control unit performs either of a first release processing for releasing the sulfur component by making the exhaust passage in a weakly rich state and a second release processing for releasing the sulfur component by making the exhaust passage in a strongly rich state having a richer degree than that of the first release processing, and the reaction suppression unit performs the reaction suppression processing on the condition that the sulfur release state is obtained by performing the second release processing among the first release processing and the second release processing.

6. The control device for the exhaust system according to claim 5, further comprising a sulfur amount calculation unit that calculates the amount of the sulfur component adhered to the catalyst as a sulfur adhesion amount, wherein the sulfur release control unit executes the first release processing when the sulfur adhesion amount is larger than the first reference value and smaller than the second reference value which is larger than the first reference value, and executes the second release processing when the sulfur adhesion amount is larger than the second reference value.

* * * * *